United States Patent [19]
Minasy

[11] 4,095,214
[45] June 13, 1978

[54] ELECTRONIC MONITORING SYSTEM AND RESPONDER DEVICE

[75] Inventor: Arthur J. Minasy, Woodbury, N.Y.

[73] Assignee: Knogo Corporation, Hicksville, N.Y.

[21] Appl. No.: 697,128

[22] Filed: Jun. 17, 1976

[51] Int. Cl.² .................. G08B 13/00; G01D 21/04
[52] U.S. Cl. ........................... 340/258 C; 340/279; 340/280
[58] Field of Search .......... 340/258 B, 258 C, 258 R, 340/279, 280; 325/118; 343/6.5 R, 5 PD; 336/92; 63/3; 324/41, 34 PS

[56] References Cited

U.S. PATENT DOCUMENTS

| | | | |
|---|---|---|---|
| 3,098,971 | 7/1963 | Richardson | 325/9 |
| 3,115,622 | 12/1963 | Jaffe | 340/224 |
| 3,164,793 | 1/1965 | Aronson | 336/92 |
| 3,182,315 | 5/1965 | Sweeney | 343/6.5 R |
| 3,478,344 | 11/1969 | Schwitzgebel | 325/118 |
| 3,493,955 | 2/1970 | Minasy | 340/280 |
| 3,500,373 | 3/1970 | Minasy | 340/258 C |
| 3,591,995 | 11/1970 | Fathauer | 340/258 C |
| 3,868,669 | 2/1975 | Minasy | 340/280 |

FOREIGN PATENT DOCUMENTS 763,681  5/1934  France .............................. 340/258 C

*Primary Examiner*—John W. Caldwell, Sr.
*Assistant Examiner*—James J. Groody
*Attorney, Agent, or Firm*—Fitzpatrick, Cella, Harper & Scinto

[57] ABSTRACT

An electronic monitoring system for monitoring the passage of objects, such as persons, past a monitoring station. An antenna is provided flat on the floor of the station to generate electromagnetic fields in the vicinity of the station and to generate electrical alarm signals whenever the electromagnetic fields are disturbed by the passage of an object carrying a special responder device. The responder device comprises an elongated bar of ferromagnetic material about which is wound the coil of a resonant electrical circuit. A mounting strap is provided to mount a responder device the leg of each object to be monitored such that the elongated bar is held perpendicular to the floor whereby maximum electrical interaction is provided between the antenna and the resonant electrical circuit.

3 Claims, 6 Drawing Figures

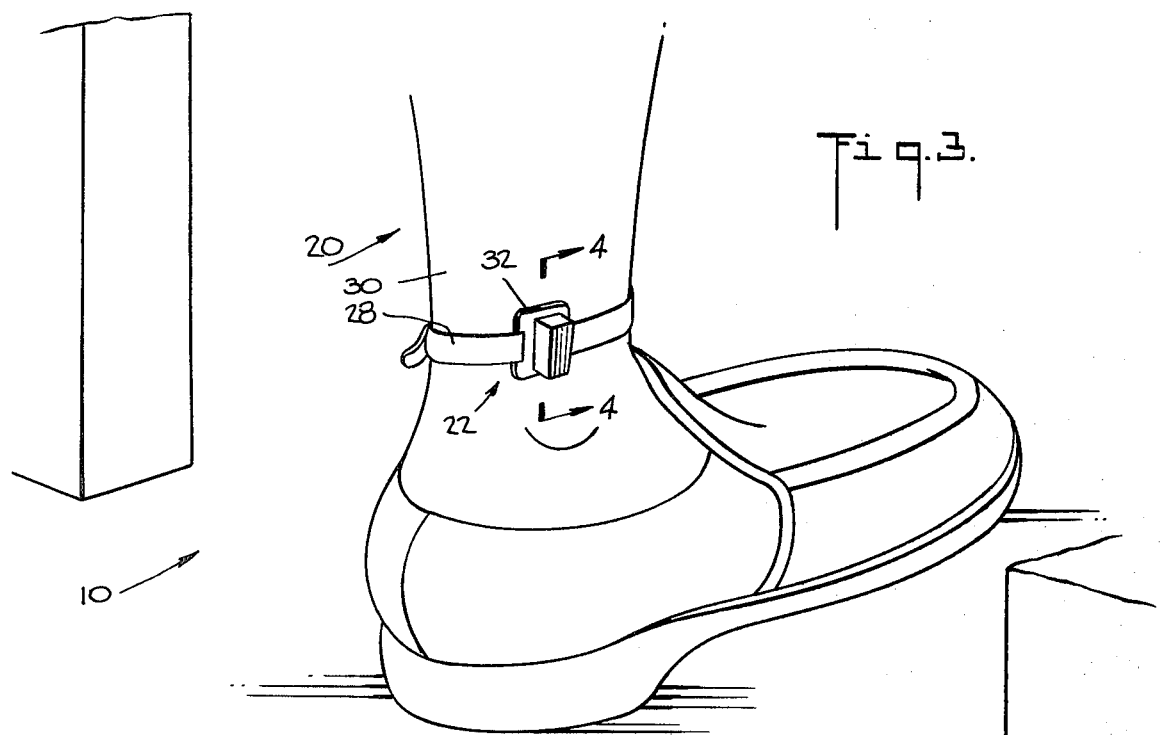
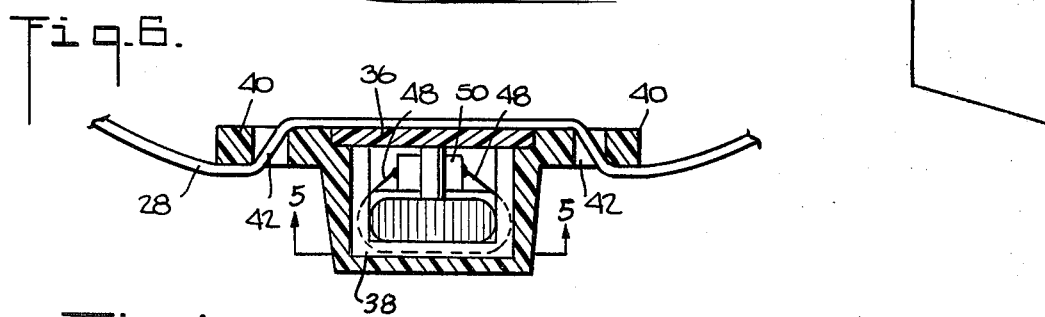
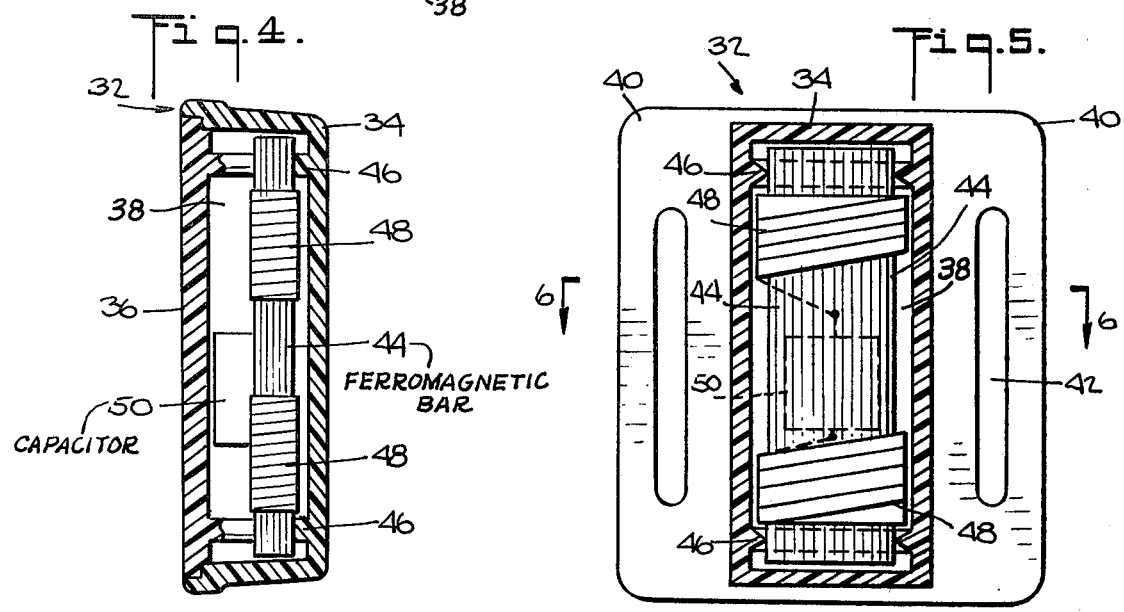

ELECTRONIC MONITORING SYSTEM AND RESPONDER DEVICE

FIELD OF THE INVENTION

This invention relates to electronic monitoring systems and more particularly it concerns novel apparatus for detecting the passage of personnel through given monitoring stations.

BACKGROUND OF THE INVENTION

Description of the Prior Art

The present invention is particularly suitable for use as patient control in hospitals, nursing homes and other establishments where ambulatory or other personnel may be free to move about but where some means is needed to detect their movement beyond certain preselected monitoring stations while allowing other personnel to pass freely through these monitoring stations.

Various electronic type systems have been proposed in the past for monitoring personnel movement. One such system is described in U.S. Pat. No. 3,115,622 to D. L. Jaffe. According to this patent, personnel to be monitored are provided with a miniature portable radio transmitter which may be worn around the neck and this radio transmitter emits signals which are detected through a receiving antenna which surrounds an area in which the personnel are normally stationed. The Jaffe system requires the provision of a battery or other electrical power source on the transmitters. In addition, it is necessary for the portable transmitters to emit signals continually and consequently that a rather substantial power supply is required for these transmitters. This, of course, makes the transmitters quite large and uncomfortable to wear.

U.S. Pat. No. 3,500,373 to Arthur J. Minasy relates to an improvement over the Jaffe system in that the Minasy system incorporates a purely passive responder circuit. The Minasy patent describes a theft detection system wherein a passive resonant circuit is embedded in a label or wafer attached to an article of merchandise to be protected. When the article passes a check station it encounters an electromagnetic field which is continually emitted at the station. Means are also provided at the station to monitor for predetermined electromagnetic responses produced at the station antenna when a resonant circuit passes by the antenna. The wafers used in the Minasy system are flat and have a relatively large expanse (e.g. 6.5 × 9.2 cm) to provide sufficient area for reacting effectively with the signals emitted by the station antenna. However, a flat expensive element of this size may be uncomfortable or bothersome for a person to wear for extended periods of time.

SUMMARY OF THE INVENTION

According to the present invention, there is provided a novel electronic monitoring system with a passive responder device which is quite small and which may be conveniently worn with comfort for extended periods of time. Although the responder device of the present invention is exceptionally small and generates no power of its own, it provides a highly reliable response signal when carried through a monitoring region.

According to one aspect of the present invention, there is provided an electronic responder device comprising an elongated bar of ferromagnetic material having an electrically conductive insulated wire coiled about it and a capacitor mounted adjacent the bar and connected to opposite ends of the wire to form a resonant circuit. An attaching device, such as an ankle strap, is provided to affix the bar and coil to the ankle or lower leg of a person or other object whose movements are to be monitored; and a mounting member holds the bar and coil to the attaching device so that the longitudinal axis of the bar is maintained in a vertical orientation.

According to a further aspect of the present invention there is also provided a novel electronic monitoring system. This novel system comprises an essentially flat loop antenna means mounted on the floor at a monitoring station. An electromagnetic monitoring means is connected to the antenna means and is operable to energize the antenna means in a predetermined frequency range. The monitoring means further includes means for detecting predetermined electromagnetic disturbances produced upon the antenna means when a resonant circuit is present in its vicinity. A responder device, comprising an elongated bar of ferromagnetic material is provided on the body of the person or object to be monitored and this bar is mounted in such manner that when the person or object passes over the flat loop antenna the longitudinal axis of the bar is perpendicular to the plane of the loop antenna. An electrically insulated, electrically conductive wire is coiled about the bar and is connected across a capacitor to form an electrically resonant circuit.

When a person or other object to which a responder device is attached passes over the antenna means at the monitoring station, the resonant circuit of the responder device is electrically coupled to the antenna means and causes a disturbance at the monitoring means; and the monitoring means in turn produces a signal indicating the presence of the person or object at the monitoring station.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the concept upon which this disclosure is based may readily be utilized as a basis for the designing of other structures for carrying out the several purposes of the invention. It is important therefore that the claims be regarded as including such equivalent structures as do not depart from the spirit and scope of the invention.

BRIEF DESCRIPTION OF THE DRAWINGS

A specific embodiment of the invention has been chosen for purposes of illustration and description and is shown in the accompanying drawings, forming a part of the specification wherein:

FIG. 3 is an enlarged perspective view showing an electronic responder device worn by a person whose movements are to be monitored by a system of FIG. 1;

FIG. 4 is an enlarged section view taken along the line 4—4 of FIG. 3;

FIG. 5 is a section view taken along line 5—5 of FIG. 4; and

FIG. 6 is a view taken along line 6—6 of FIG. 5.

As shown in FIG. 1 there is provided a monitoring station comprising a doorway 10 through which personnel must pass as they move into and out from a protected area. An antenna facility 12 is provided at or adjacent to the doorway 10. This antenna facility comprises an arrangement for holding a loop antenna in a flat plane along the floor in the vicinity of the doorway. As shown, the antenna facility 12 is formed by routing out a groove in the floor according to the pattern of the loop antenna. A loop antenna 13 is positioned in the groove and the groove is then filled over with some suitable durable but electrically insulative material. Where a permanent installation is not desired, the antenna facility 12 may comprise a mat laid adjacent the doorway 10 with the loop antenna 13 embedded in the mat. As can be seen in FIG. 2, the loop antenna 13 comprises a pair of generally rectangular loops 14 and 15 spaced apart from each other, adjacent the doorway 10. Preferably, these loops are each single turn loops which extend across the width of the doorway 10. If, however, the doorway is less than about 1.2 meters wide, it is preferred to have the loops each comprise two turns. The loop width and spacing is preferably about 0.3 meters. Each loop is connected, via twisted wires 16 to an electronic monitoring unit 18.

The electronic monitoring unit 18 may comprise the system shown and described in the above identified Minasy U.S. Pat. No. 3,500,373. As there described, the system comprises an oscillator which is driven to produce electromagnetic signals at a cyclically swept frequency, that is, the oscillator output may vary between 1.95 and 2.05 megahertz at a 500 hertz rate. These electromagnetic signals are communicated via the twisted wires 16 to the antenna loops 14 and 15 and these in turn generate a varying magnetically inductive field in the vicinity of the doorway 10. When this field is disturbed, as by the presence of a circuit having a resonant frequency within the 1.95 – 2.05 megahertz range, this disturbance causes a signal change in the antenna loops and this disturbance is capable of being detected in the electronic monitoring unit 18.

Figure 1:
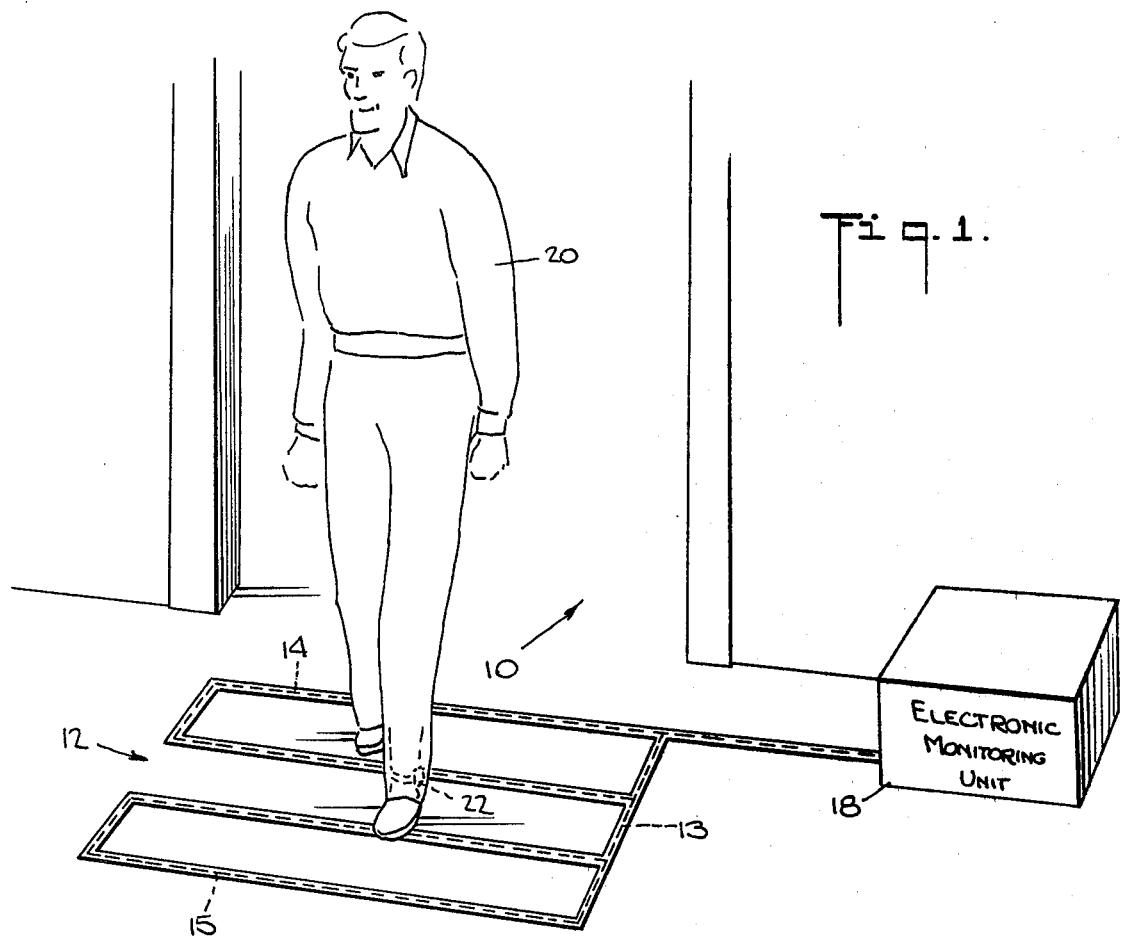
FIG. 1 is a perspective view showing an electronic monitoring system in which the present invention is embodied.
Figure 2:
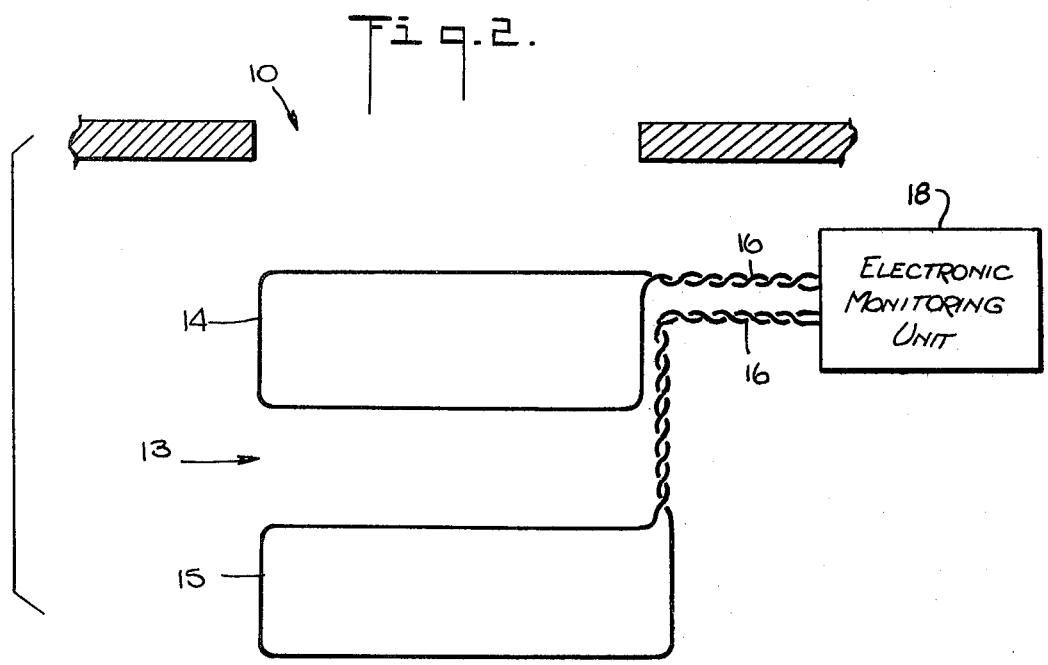
FIG. 2 is a fragmentary plan view showing a passageway and antenna arrangement forming a part of the electronic monitoring system of FIG. 1.

As shown in FIG. 1, a person 20 whose movements are to be monitored is provided with a responder device 22 which is attached to his ankle. Thus as the person 20 walks through the doorway 10 and steps onto the antenna facility 12, the responder device 22 becomes positioned close to the antenna loops 13 and 14. The responder device 22, as will be described more fully hereinafter, includes a resonant electronic circuit which reacts with the fields being generated by the loop antennas 13 and 14 so that a disturbance is produced which is detected by the monitoring unit 18. In this way the passage of the person 20 through the doorway 10 is detected.

Turning now to FIG. 3, it will be seen that the responder device 22 comprises an ankle strap 28 and a resonant circuit casing 32. The ankle strap is adapted to be secured about the ankle 30 of the person 20 wearing the device.

As can be seen in FIGS. 4, 5 and 6, the resonant circuit casing 32 includes a hollow rectangular portion 34 and a flat back portion 36 against which abuts the rectangular portion 34 to form an inner chamber 38. The casing 32 is formed with wings 40 which extend laterally outward from the rectangular portion 34; and slots 42 are formed in these wings for accommodating the strap 28. With this arrangement, the longitudinal dimension or axis of the hollow rectangular portion is held substantially perpendicular to the plane of the ankle strap 28. Further, since the ankle strap is adapted to fit around the ankle of the person 20, as he walks over the antenna loops 13 and 14 the responder device 22 is not only positioned close to the antenna loops, but the longitudinal axis of the rectangular portion 34 of the casing is maintained substantially perpendicular to the plane of the antenna loops.

An elongated bar 44 of ferromagnetic material is fitted inside the rectangular portion 34 and is held securely therein by means of upper and lower lugs 46. The bar itself is of generally rectangular elongated configuration and corresponds generally to the configuration of the rectangular portion 34 of the casing 32. Thus, when the responder device is worn on the ankle as illustrated in FIG. 3, the bar 44 is also oriented with its longitudinal axis substantially perpendicular to the plane of the antenna means 12.

An electrically conductive insulated wire 48 is coiled about the bar 44 and the ends of the wire are connected to a capacitor 50 which is fitted inside the inner chamber 38 adjacent the bar 44. The wire 48 coiled about the bar 44 cooperates with the capacitor 50 to form a resonant electrical circuit. The parameters of the capacitor 50 and of the coil formed by the wire 48 are set so that the resonance frequency of the circuit thus formed lies within the frequency sweep range of the electronic monitoring unit 16. When a person wearing the responder device 22 walks through doorway 10, the responder device 22 is positioned close to the antenna loops 14 and 15 and is oriented with the longitudinal axis of the bar 44 substantially perpendicular to the plane of the antenna loops 14 and 15. It has been found that the resonant circuit of the responder device 22 provides good interaction with the electromagnetic fields developed by the antenna loops so that a reliable signal is produced in the electronic monitoring unit 18. It will be noted that the responder device 22 does not make use of an expansive antenna portion lying in a plane parallel to the plane of the system antenna loops 14 and 15. Nevertheless, the signal producing capability of the responder device remains quite high. It is believed that this high response characteristic is due to the fact that the elongated bar 44 serves to deflect a substantial portion of the electromagnetic field produced by the antenna loops so that more of this field is presented to the responder device coil 48 than would be present in a coil of this size in the absence of the bar 44. It has been found that the bar 44 is more effective in directing magnetic fields when it is perpendicular to the plane of the source of the field than when it lies in any other position. Thus, by providing a mounting means whereby a bar of ferromagnetic material is positioned perpendicular to the plane of an antenna means, a substantial amount of interaction can be obtained between the responder device and an interrogation antenna.

Because of the high degree of interaction between the responder device and the interrogation antenna, it is possible to reduce the dimensions of the responder device to a considerable extend without adversely affecting the performance of the system. In fact, satisfactory performance has been achieved with a responder device having a length of approximately 3.8 centimeters, a thickness of less than 1.3 centimeters and a width (excluding the wings 40) of about 1.7 centimeters. A responder device of this size may be worn comfortably and conveniently by most persons.

It will be appreciated that the present invention can be used various situations where movements of personnel are to be monitored. This would include, for example, prisons, hospitals, playgronds, etc. In addition, the invention can be adapted for use in other fields, for example, in animal husbandry or for the monitoring of movements of any animal or thing which is capable of having the responder device mounted thereon in the described orientation without interference with normal functioning of such animal or thing.

Having thus described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. An electronic monitoring system for detecting the passage of objects past a given monitoring station, said system comprising an essentially flat loop antenna means which lies in a single plane, said antenna means being disposed at the surface of the floor adjacent a passageway through said given monitoring station so that said plane of said antenna is substantially parallel to the plane of the floor, electromagnetic monitoring means connected to said antenna means, said monitoring means being operable to energize said antenna means in a predetermined frequency range and to detect predetermined electromagnetic responses produced upon said antenna means when a resonant circuit is present in the vicinity of said antenna means, and a responder device comprising an elongated bar of ferromagnetic material, an insulated electrically conductive wire coiled about said bar, a capacitor connected to the ends of said wire to form a resonant circuit and means mounting said bar, wire and capacitor on the leg of an object whose movement is to be monitored, said mounting means comprising a casing which holds said bar, said coil and said capacitor and a fastening element for holding said casing to the leg of said object, said fastening element being oriented with respect to said casing such that the longitudinal axis of said bar is maintained substantially perpendicular to said plane of said loop antenna means, whereby said predetermined electromagnetic responses cause a signal change in said antenna which change is detected by said monitoring means.

2. An electronic monitoring system according to claim 1 wherein said antenna means comprises at least one essentially rectangular loop extending across said passageway.

3. An electronic responder device for use in monitoring the movement of personnel past a monitoring station, said responder device comprising an elongated bar of ferromagnetic material, an electrically conductive, insulated wire coiled about said bar, a capacitor mounted adjacent said bar and connected to opposite ends of said wire to form therewith a resonant circuit, an ankle strap configured to fit around the ankle of a person, a mounting member comprising a hollow casing attached to said ankle strap, said casing holding said bar, said insulated wire coiled about said bar and said capacitor, said mounting member being formed with upper and lower lugs extending inwardly of said casing to contact opposite end regions of said bar for mounting said bar with its longitudinal axis extending perpendicular to the plane of said ankle strap.

* * * * *